United States Patent [19]

Sato

[11] 3,925,617

[45] Dec. 9, 1975

[54] TELEPHONE AUTO-ANSWERING DEVICE WITH TIME RECORDING

[75] Inventor: Takashi Sato, Tokorozawa, Japan

[73] Assignee: Pioneer Electronic Corporation, Tokyo, Japan

[22] Filed: Nov. 13, 1972

[21] Appl. No.: 305,774

[30] Foreign Application Priority Data

Nov. 16, 1971 Japan ............................ 46-91638

[52] U.S. Cl. ............................ 179/6 R; 179/6 TA

[51] Int. Cl.$^2$ ............................ H04M 11/00

[58] Field of Search ........... 179/6 R, 6 TA, 100, 11; 346/33 M; 325/311

[56] References Cited

UNITED STATES PATENTS

| | | | |
|---|---|---|---|
| 1,831,331 | 11/1931 | Thornton | 179/6 R |
| 1,843,849 | 2/1932 | Thornton | 179/6 R |
| 2,580,447 | 1/1952 | Lutz | 179/6 TA |
| 2,680,150 | 6/1954 | Weld | 179/6 TA |
| 2,966,552 | 12/1960 | Campbell | 179/6 TA |
| 3,037,569 | 6/1962 | Rupp | 179/100.11 |
| 3,372,240 | 3/1968 | Boyers | 179/6 TA |
| 3,511,935 | 5/1970 | Mizuno | 179/6 E |
| 3,591,731 | 7/1971 | Stancil | 179/100.2 MD |
| 3,637,952 | 1/1972 | Hataya | 179/6 TA |

FOREIGN PATENTS OR APPLICATIONS

| | | | |
|---|---|---|---|
| 1,177,857 | 9/1964 | Germany | 346/33 M |

OTHER PUBLICATIONS

Radio Amateur's Handbook; 1971; p. 563.

*Primary Examiner*—Bernard Konick
*Assistant Examiner*—Alan Faber
*Attorney, Agent, or Firm*—Sughrue, Rothwell, Mion, Zinn & Macpeak

[57] ABSTRACT

In a telephone auto-answering device adapted to respond automatically to a call and record a caller's message on a recording tape, time recording apparatus operating independently at preset intervals to record time information on the recording tape.

5 Claims, 2 Drawing Figures

TELEPHONE AUTO-ANSWERING DEVICE WITH TIME RECORDING

BACKGROUND OF THE INVENTION

This invention relates to a telephone auto-answering device capable of recording a caller initiated message and the approximate time the caller's message is recorded and, more particularly, to a telephone auto-answering device including means for recording time information on a message recording tape at preset intervals.

Conventional telephone auto-answering devices are designed to send out an answering message to a caller and record the message of the caller on a recording tape incorporated therein. Such devices do not record the time the caller's message is recorded. Thus, for example, when a business uses such a conventional telephone auto-answering device having no provision for time information recording, the time an order is placed with the business is unknown to the user of the device and, thus, if a system is employed where delivery of goods takes place at different times depending upon the time of receipt of the order by such devices, troubles would rise unnecessarily between the device user and customers.

Further, if the caller dials and hears the answer-message from such telephone auto-answering device and then sends his message informing the device user that he will call again some definite number of hours thereafter, the device user cannot know, when he reproduces that message, about a reference time or the time the caller made the recording and thus cannot estimate the time when the caller will call again.

SUMMARY OF THE INVENTION

Therefore, it is an object of the present invention to eliminate the foregoing inconveniences of the conventional telephone auto-answering device.

It is a specific object of the present invention to provide a telephone auto-answering device including a time recorder for recording time information on a recording tape at preset intervals to give the device user a time reference relative to the time the caller's message is recorded.

According to the present invention an improved telephone auto-answering device is provided, which includes a time recorder for recording time information at preset intervals on a recording tape so that the recorded time information or time indication in voice will serve as a time reference relative to the time the caller's message is recorded when the device user reproduces the recorded message.

Specifically, the telephone auto-answering device constructed in accordance with the present invention includes, in addition to elements generally employed in the conventional telephone auto-answering device means for recording time information at preset intervals on a recording tape which also records the caller's message. When the recording tape has at least two recording tracks, it is possible to record the caller's message on one track and the time reference information on another track.

DESCRIPTION OF THE PREFERRED EMBODIMENTS

First, the general operation of a conventional telephone auto-answering device will be described with reference to FIGS. 1 and 2.

Figure 1:
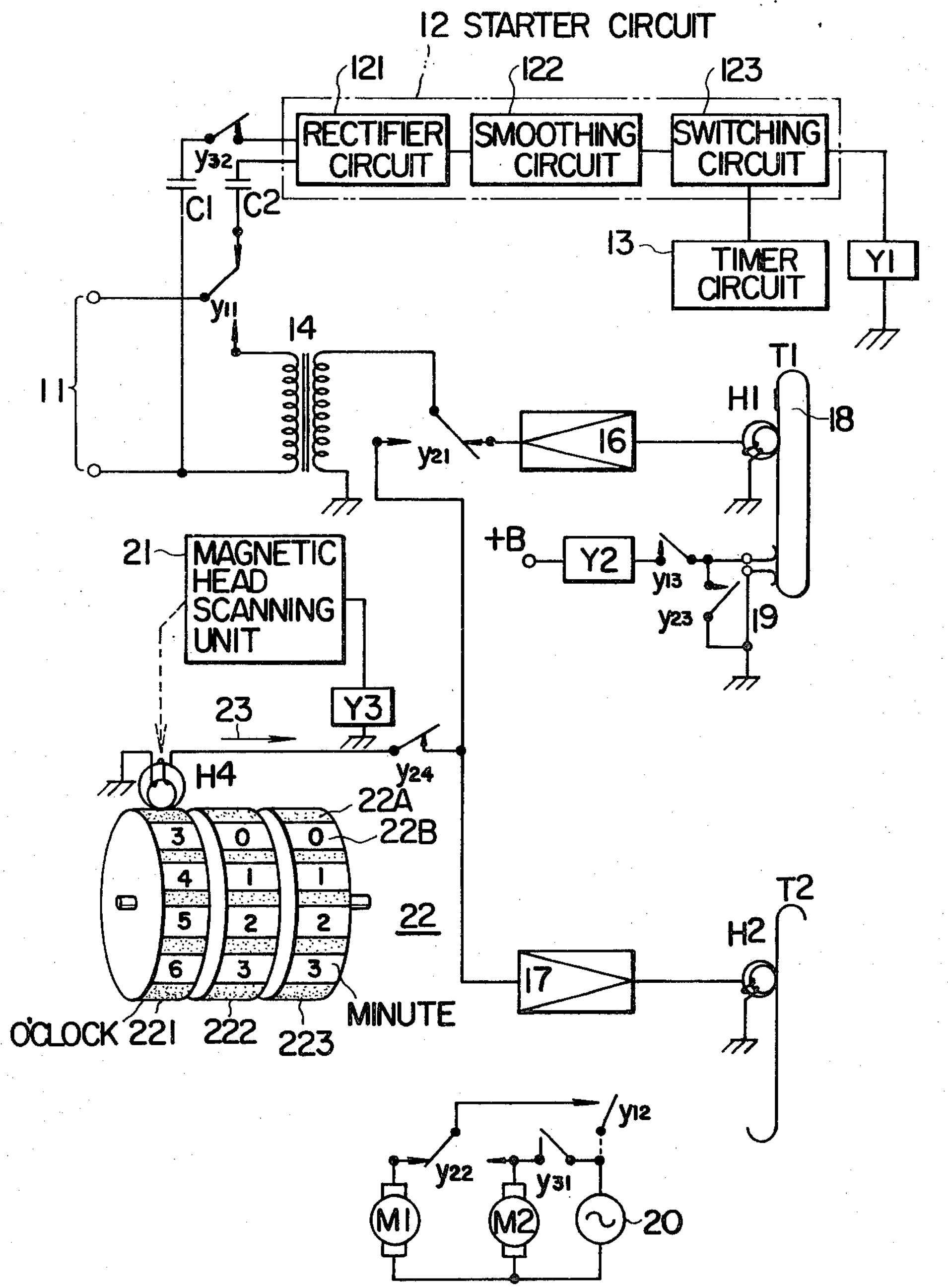
FIG. 1 is a simplified circuit diagram of an embodiment of a telephone auto-answering device constructed in accordance with the present invention employing a voice clock to generate time information.
Figure 2:
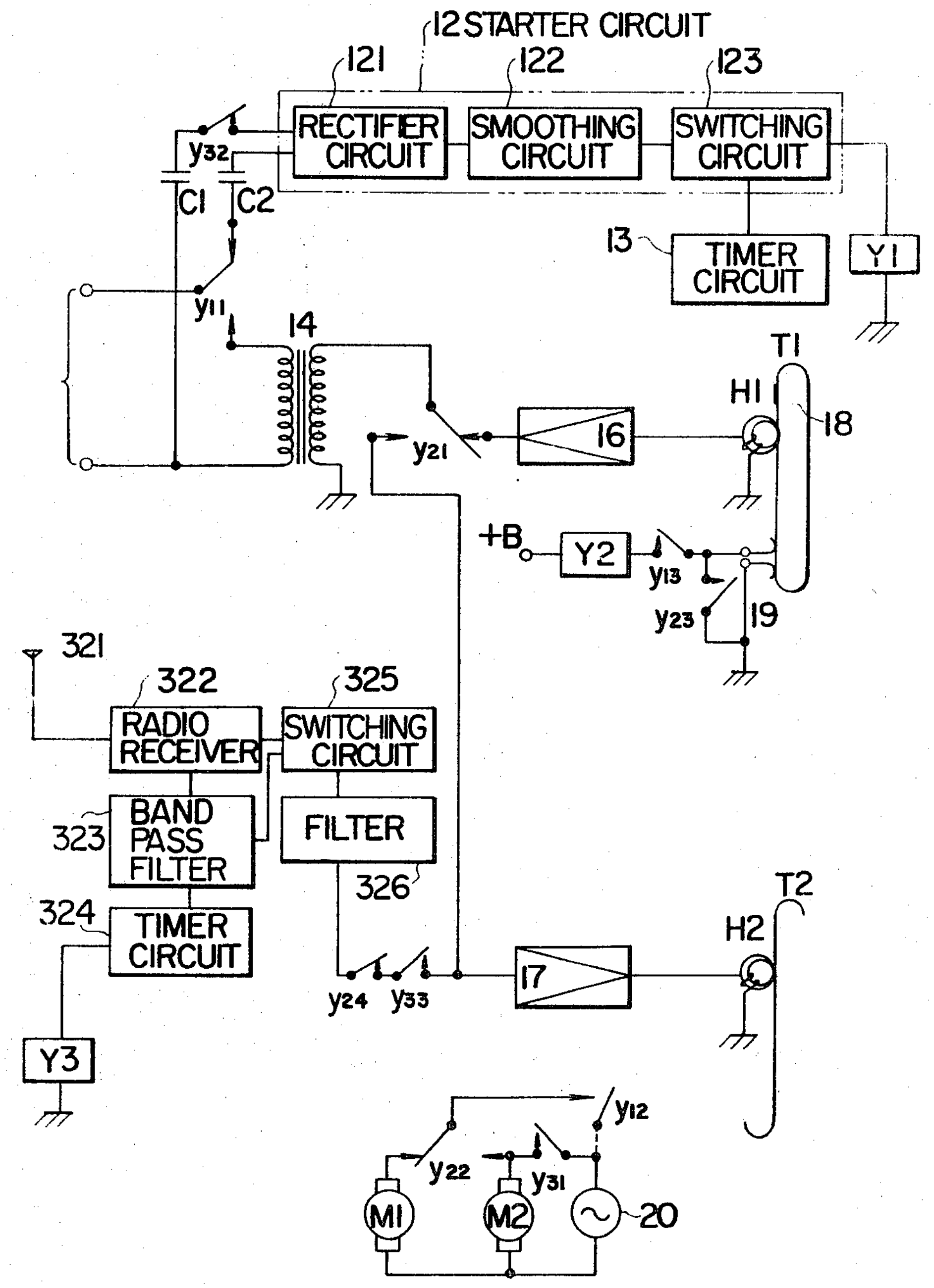
FIG. 2 is a view similar to FIG. 1 in which a radio receiver unit adapted to receive the so-called radio time tone is employed to generate time information.

In FIGS. 1 and 2, when a calling signal or ringing signal arrives at terminals 11, coupled to a telephone line, it passes through a relay contact y11, coupling capacitors C1 and C2, a rectifier circuit 121 and a smoothing circuit 122 to a timer circuit 13. Thus, the timer circuit operates and turns on a switching circuit 123, whereby a relay Y1 is energized to switch its contacts y11, y12 and y13. By switchover of contact y11, the telephone line is coupled to a transformer 14 to thereby complete a communication network. On the other hand, by switchover of contact y12 a motor M1 is coupled across a power source 20 whereby it rotates. In response to the rotation of motor M1, an answering tape T1 is fed past head H1 and a previously recorded answer-message is reproduced in the manner well known in the art and sent out to a caller.

As the answering tape T1, which is of the endless type, completes one revolution, a conductive foil 18, bonded to the tape, short-circuits electrodes 19 so that a relay Y2 is energized and held in the energized state by itself.

By switchover of contact y22, electric power of the power source 20 is removed from the motor M1 and supplied to a motor M2, so that the answering tape T1 stops, whereas a recording tape T2 starts. As the recording tape T2 moves, a message from the caller is recorded on the tape T2 through a magnetic head H2.

Then, when a period, determined by the timer circuit 13, elapses after receipt of the call, the relay Y1 recovers and switches its contacts back to their initial illustrated positions, so that the auto-answering operation of the device terminates and the system returns to the stand-by state.

Now the characterizing feature of the present invention will be described.

FIG. 1 illustrates one embodiment of the present invention which includes a voice clock 22 with a timer (not shown) that is settable to operate at preset intervals.

In FIG. 1 when one span of the preset intervals elapses, the timer, of conventional design, operates and actuates a magnetic head scanning unit 21 to thereby energize a relay Y3. Due to closing of relay contact y31 the motor M2 rotates to feed the recording tape T2. It will be noted, however, that by opening contact y32 any calling signal to be supplied to the starter circuit 12, encircled by dotted lines in the drawing, is inhibited at this time and the device is kept in an unanswerable condition.

As the magnetic head scanning unit 21 starts to operate, a magnetic head H4 comes close to time voice recorded sections 22A of drum 221, and scans one section 22A and one section 22B of drum 222 and the like in the direction of arrow 23 where drums 221–223 form the voice clock 22. As schematically illustrated in FIG. 1, for example, one of the recorded sections 22A of the first drum 221 has the voice "now three o'clock"

previously recorded thereon, one recorded section 22B of drum 222 has the voice "zero minute", and so on. Thus, any combination of time information voice pieces recorded in sections 22A, 22B can be reproduced in the order of drums 221, 222 and 223 as the magnetic head H4 scans the registered recorded sections in the direction of the arrow.

The reproduced time signal voice is applied through contact *y*24 to an amplifier 17 where it is amplified, and then recorded on the recording tape T2 by means of the magnetic head H2. When a voice recording of a piece of time information has been made, the relay Y3 recovers and returns its contacts back to their initial de-energized positions.

During the auto-answering operation of the device, when the answering tape T1 moves one revolution and the conductive foil 18 short-circuits the electrodes 19, the relay Y2 operates to thereby open its contact *y*24 and disconnect the line from the voice clock 22 to the message recording tape. Therefore, if relay Y2 is in its energized state, the time signal generated by the voice clock 22 will not be recorded on the recording tape T2 even if the magnetic head scanning unit 21 is operating.

Now another embodiment of the present invention will be described with reference to FIG. 2, which utilizes a radio receiver unit 321 to generate the time information signal to be recorded on the recording tape T2.

In FIG. 2 a radio receiver 322 is adapted to receive the so-called radio time tone or time signal broadcast at certain intervals by any broadcasting station (for example, Japan Broadcasting Corporation "N.H.K." broadcasts a time tone consisting of a preliminary tone of 440 Hz and a correct-time tone of 880 Hz.).

When the receiver 322 receives the time tone of such characteristics as above, the preliminary tone passes through a band pass filter 323 having a pass frequency of 440 Hz and actuates a timer circuit 324 which in turn energizes a relay Y3 (corresponding to relay Y3 of FIG. 1) for a certain period established by the timer circuit 324. The output of the filter 323 is also used to turn on and maintain in the on-state for a relatively short period a switching circuit 325, coupled to the message recording circuit of the tape T2, whereby the preliminary and correct-time tones received by the radio receiver 322 pass during that period. However, because a band pass filter 326 having a pass frequency of 880 Hz is coupled in the signal transfer line as shown in FIG. 2, the preliminary tone is blocked and only the correct-time tone passes through the filter 326.

It should be noted that at this time the recording tape T2 has already started to rotate and the device has been switched to the unanswerable condition since contacts *y*31–*y*33 of the relay Y3 are turned over as the case of the arrangement of FIG. 1. Thus, after passing through contacts *y*14 and *y*33 the correct-time tone is amplified by the amplifier 17 and recorded on the recording tape by means of the magnetic head H2.

As with the operation of the arrangement of FIG. 1, while the device of FIG. 2 is the answering operation, when the answering tape T1 makes one revolution and the conductive foil 18 short-circuits electrodes 19, the relay Y2 opens its contact *y*24 to disconnect the signal transfer line from the radio receiver unit to the recording tape T2. Therefore, while the relay Y2 is in the energized state, the ratio time tone is prevented from being recorded on the recording tape T2.

In the illustrated devices of FIGS. 1 and 2, because the recording tape T2 is assumed to have only one recording track, the recording of the time information reference signal or voice signal is inhibited during the auto-answering operation or the relay Y2 being in the energized state in order to prevent mixed recording of the caller's message and the time information. However, if a tape having at least two tracks is employed as the recording tape, it is possible to record the caller's message and the time reference signal simultaneously in parallel.

Further, in the arrangement of FIG. 1, it is possible by modification of the timer unit to actuate the magnetic head scanning unit 21 every thirty minutes in the day time and every 2 hours in the night time.

As would be appreciated from the foregoing description, the present invention overcomes the inconveniences and drawbacks of the conventional telephone auto-answering device. Because the reference time information is recorded while the device is not recording the caller's message, the normal message recording period is not prolonged and no additional fee for telephone communications is charged to the caller. Further, in the modified form, it is possible to preset different time intervals for time information recording depending upon different time zones, so that the recording tape is effectively utilized by minimizing the number of times of time information recordings.

I claim:

1. In a telephone auto-answering device including an answering tape and a recording tape and comprising starter circuit means responsive to an incoming calling signal from a caller for controlling an auto-answering operation of the device, a reproducing means responsive to actuation of said starter circuit means for driving the answer tape and reproducing an answer-message previously recorded on the answering tape to send out the answer-message to the caller, and recording means responsive to the termination of the answer-message send-out operation for recording the caller's message on the recording tape, the improvement comprising voice clock means coupled to said recording means and operable to reproduce a pre-recorded voice signal indication of the time, timer means automatically operating said voice clock means at preset intervals for continually recording said voice signal time indications on the recording tape at said preset intervals, and means for preventing said recording means from recording the time indications on the recording tape when said recording means is recording the caller's message.

2. The device as specified in claim 1 wherein said preventing means comprises switch means, operative upon the termination of said answer-message send-out operation, for breaking the connection between said voice clock means and said recording means.

3. The device as specified in claim 2 further comprising means on the answer tape for operating said switch means upon the termination of said answer-message send-out operation.

4. In a telephone auto-answering device including an answering tape and a recording tape and comprising starter circuit means responsive to an incoming calling signal from a caller for controlling an auto-answering operation of the device, a reproducing means responsive to actuation of said starter circuit means for driving the answer tape and reproducing an answer-message previously recorded on the answering tape to send out the answer-message to the caller, and recording means responsive to the termination of the answer-message send-out operation for recording the caller's message on the recording tape, the improvement comprising voice clock means coupled to said recording means and operable to reproduce a pre-recorded voice signal indication of the time, timer means automatically operating said voice clock means at preset intervals for continually recording said voice signal time indications on the recording tape at said preset intervals, and means for preventing said starter circuit means from responding to an incoming calling signal when said recording means is recording said time indications.

5. The device as specified in claim 4 wherein said preventing means comprises switch means, responsive to the operation of said voice clock means during said preset intervals, for preventing said starter circuit means from responding to an incoming calling signal.

* * * * *